Aug. 11, 1931.   H. C. MUMMERT   1,818,423
METAL FRAMED STRUCTURE FOR AEROPLANES
Filed May 20, 1929
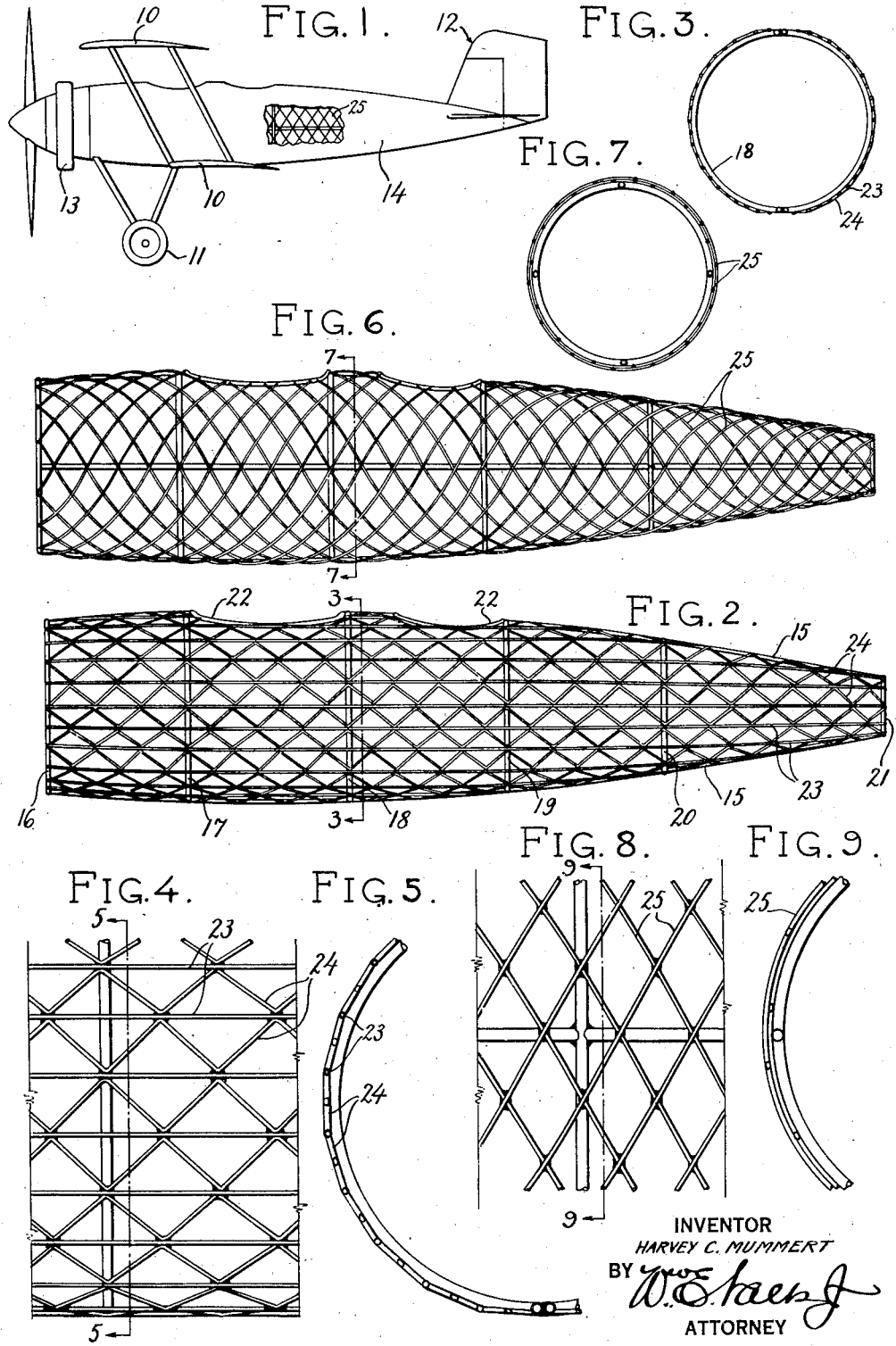
INVENTOR
HARVEY C. MUMMERT
BY
ATTORNEY Patented Aug. 11, 1931

1,818,423

UNITED STATES PATENT OFFICE

HARVEY C. MUMMERT, OF HAMMONDSPORT, NEW YORK

MTAL FRAMED STRUCTURE FOR AEROPLANES

Application filed May 20, 1929. Serial No. 364,347.

My invention relates to aircraft and more particularly to an all metal framed structure for an aeroplane fuselage, wing, or the like.

An object of the invention is to provide in an aeroplane fuselage, wing, or the like, a skeleton frame, and attached thereto a load sustaining net work of surface diagonals of metal.

A further object of the invention is to provide in an aeroplane fuselage, wing, or the like, a surface net work of relatively widely spaced metal members, the arrangement of said members being preferably such that the metal surfacing, over which the outer fabric covering is drawn and fastened, constitutes the principal load sustaining part or portion of the composite frame.

A still further object of the invention is to provide an all metal framed structure in which the relative arrangement of the parts thereof is particularly adapted to the fabrication and construction of an all metal monocoque type fuselage or body.

Heretofore, in the design and construction of monocoque fuselages or bodies of aircraft, it has been the practice to employ as an outer skin or covering, wood veneer or ply-wood as the principal load sustaining part or portion of the shell. Such use of wood, however, is fundamentally unsound. Not only is an all wood monocoque fuselage or body costly, and heavy as compares to fuselages of truss construction, but such fuselages offer but little or no protection to the occupants of the machine in the event of forced landings or crashes. For this reason, and for other obvious reasons, wood as a material in aeroplane construction and design is more or less avoided, and metal (either steel tubing or tubing of a light aluminum alloy) used instead. No one, insofar as I am aware, has previously attempted to design and construct a monocoque type fuselage or body wholly and entirely of metal. In doing so I have achieved a safe, strong, light, and more or less inexpensive type body possessed of all of the aerodynamic advantages inherent in monocoque designs. The same principles, moreover, are applicable, tho to a lesser degree, to other aeroplane parts such as wings, nacelles, aerofoils, etc.

In the drawings, wherein like reference characters denote like or corresponding parts, Fig. 1 is a side elevation of an aeroplane with a portion of the monocoque fuselage covering broken away;

Fig. 2 is a side elevation of the preferred form of metal fuselage frame;

Fig. 3 is a section on the line 3—3 of Fig. 2;

Fig. 4 is an enlarged fragmentary side elevation of a portion of the metal frame;

Fig. 5 is a section on the line 5—5 of Fig. 4;

Fig. 6 is a side elevation of an alternative or modified form of all metal fuselage frame;

Fig. 7 is a section on the line 7—7 of Fig. 6;

Fig. 8 is a view similar to Fig. 4 showing the constructional details of the modified form of fuselage, and Fig. 9 is a section on the line 9—9 of Fig. 8.

In Fig. 1 of the drawings an aeroplane of more or less conventional design is shown. Said aeroplane comprises the usual supporting surfaces 10—10, landing gear 11, empennage 12, power plant 13, and fuselage or body 14, the latter, as detailed in the remaining figures of the drawings, being of the monocoque all metal type. As indicated in Figs. 2 to 5, inclusive, the preferred form of fuselage comprises what I prefer to designate an inner and an outer metal fuselage frame. The inner frame includes two or more longitudinal frame members 15—15 and a plurality of intersecting annular transverse frame members 16, 17, 18, 19, 20 and 21. Said annular frame members 16 to 21, inclusive, vary in diameter according to location, the rear annular frame member 21 being the smaller due to its location at or near the tail end of the machine. Preferably said frame members are of relatively heavy steel tubing welded at their points of intersection. Where one or more cockpits are provided, each cockpit opening (as indicated in Fig. 2) is appropriately defined as indicated at 22.

The outer frame structure preferably consists of a plurality of relatively narrowly spaced longitudinal frame members 23 welded to the transverse frame members 16 to 21, inclusive, at their points of intersection. Between the narrowly spaced longitudinal frame members 23 diagonal frame members 24 are provided. Said diagonal frame members (see Fig. 4) are preferably formed of a continuous length of metal alternately angled from the foremost to the rearmost of the annular frame members of the inner frame. At each bend of said metal lengths the diagonal frame members bear directly on the longitudinal frame members 23 and are welded thereto as shown. Preferably the bends in said diagonal frame members are so arranged and related one to the other as to provide in effect, at least, continuous diagonals arranged to extend spirally about the fuselage from end to end. Said diagonal frame members moreover at their points of intersection with the inner frame members are welded thereto as shown. Thus constructed an all metal monocoque shell of great strength, light weight and inexpensive manufacture, is provided. Said shell is so designed as to adequately distribute and perfectly sustain the operating loads whether torsional, longitudinal or transverse. When completed the monocoque frame has fastened thereto a suitable fabric covering such as is ordinarily used in aeroplane construction.

In the modified or alternative construction illustrated in Figs. 6 to 9, inclusive, the outer framing, instead of comprising a plurality of longitudinals and laced diagonals, consists merely of a plurality of intersecting spirally arranged outer frame members 25. Like the outer frame members in the preferred form of fuselage construction, said spirally arranged frame members 25 are welded at their points of intersection and to the members comprising the inner frame. In both types of fuselage the outer frame members are preferably constructed of light gauge steel tubing of such weight and size as to provide a load sustaining net work of surfacing members adequate in every respect for the purposes intended.

As previously intimated, the same principles of construction may be applied to wing structures, nacelles, etc. Not only do the surface members carry and distribute substantially the entire operating loads, but due to the form given them by the inner frame members, which are widely spaced, said outer surfacing may partake of any cross-sectional shape desired. Moreover, an all metal monocoque type fuselage such as that suggested herein, possess all of the aerodynamic advantages inherent in fuselages of monocoque design.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. A metal framed structure for an aeroplane wing, fuselage or the like comprising a skeleton frame, and attached thereto a network of load sustaining surface longitudinals and diagonals rigidly fastened directly one to another and to said skeleton frame.

2. In a metal monocoque fuselage, a skeleton frame, a plurality of longitudinally extending load sustaining members, a plurality of diagonally extending load sustaining members fastened directly to said longitudinally extending members, said longitudinally extending members and said diagonally extending members providing in the aggregate a surface netting for said skeleton frame, and a covering for said netting.

3. In a metal structure for aeroplanes, a plurality of substantially straight longitudinally extending load sustaining members, a plurality of angled longitudinally extending load sustaining members associated with said straight members, each angled member being interposed between a pair of straight members and being alternately secured directly to each of the pair of adjacent straight members, the straight members and the angled members forming in the aggregate a network of load sustaining members.

4. In a metal structure for aeroplanes, a plurality of substantially straight longitudinally extending load sustaining members, a plurality of angled longitudinally extending members associated with said straight members, each angled member being interposed between a pair of straight members and being alternately welded to each of the pair of adjacent straight members, the straight members and the angled members forming in the aggregate a network of load sustaining members.

In testimony whereof I hereunto affix my signature.

HARVEY C. MUMMERT.